Patented Nov. 20, 1945

2,389,284

UNITED STATES PATENT OFFICE 2,389,284

SELECTIVELY HYDROGENATED TALL OIL
AND METHOD OF MAKING SAME

Joseph Abrahm Valentine Turck, Jr., and John Ross, New York, N. Y., assignors to Colgate-Palmolive-Peet Company, Jersey City, N. J., a corporation of Delaware No Drawing. Application July 5, 1940,
Serial No. 344,066

11 Claims. (Cl. 260—97.5)

The present invention is directed to the preparation of valuable products from tall oil and in particular to the selective partial hydrogenation of tall oil.

Tall oil is a valuable source of fatty acids, resin acids and sterols but, because of its bad odor and color, it ordinarily requires material purification before it can be used for the usual commercial purposes. Furthermore, when employed as a soap in the preparation of laundry bar soaps and the like, it is often unable to hold the necessary soap builders but permits their separation during manufacture. It has been found possible to overcome some of these deficiencies by completely saturating the tall oil acids with hydrogen but in certain cases this is expensive. For many purposes the mono-olefinic acids are particularly desirable but prior art methods fully saturated the unsaturated fatty acids as well as the rosin acids.

It has now been discovered that tall oil may be partially hydrogenated under certain conditions to obtain an increase and maximum yield of oleic acid in the mixture. In addition, it has been found that all unsaturated tall oil constituents may be selectively hydrogenated by control of the temperature conditions of hydrogenation. It has also been discovered that tall oil may be partially and specifically hydrogenated and the constituents separated to obtain relatively pure products of good color, odor, and other properties. Furthermore, it has been found that tall oil fatty acid constituents can be economically hydrogenated with exact control to form valuable materials without substantial hydrogenation of the rosin contained therein.

It has been found that tall oil fatty acids may be selectively hydrogenated by control of the temperature, whereas prior art methods of control by length of time of treatment and pressure are not exact and produce totally hydrogenated or mixed partially hydrogenated constituents.

By the present invention it is now possible at low cost to obtain tall oil or its soap products, which are of a controlled constitution, of a very light color, do not darken on standing, and are stable, higher melting, of better odor, and in a much better condition for general use.

Operating the present invention in a batch procedure, the tall oil is placed in a hydrogenation autoclave along with a small amount of hydrogenation catalyst. The autoclave is closed and evacuated. Hydrogen is introduced into the autoclave until the pressure is above atmospheric. The autoclave is again evacuated in order to sweep out residual air from the system. The autoclave is then filled with hydrogen to a substantial pressure, preferably above 50 pounds per square inch, e. g. about 600 pounds per square inch, at about room temperature. The contents of the autoclave are then agitated while raising the temperature at a constant rate, thus raising the pressure in the chamber at a constant rate. When hydrogen starts to be absorbed by a constituent of the composition under treatment the rate of pressure increase will no longer be in the same ratio to the rate of temperature increase. If the temperature is held constant, at this point or slightly higher, as soon as this condition occurs, it is possible to selectively hydrogenate one of the ingredients of the mixture. For example, by hydrogenating the tall oil in the presence of nickel-kieselguhr catalyst at a temperature between about 50° C. and 70° C., it is possible to hydrogenate the polyolefinic acids to mono-olefinic acids, e. g. oleic acid or its isomers, without hydrogenating the oleic acid, rosin or unsaponifiable constituents in the oil. If it is desired to hydrogenate the tall oil olefinic fatty acids to saturated fatty acids, such as stearic acid, without hydrogenating the rosin acids, the temperature in this example is at least 80° to 90° C. but not more than about 135° C. The rosin acids may be hydrogenated at 140° C. and the unsaponified materials at temperatures of about 155° to 165° C. or higher.

These temperatures apply to the use of a nickel catalyst which may be prepared by precipitating nickelous carbonate or oxycarbonate on kieselguhr, drying the impregnated earth at about 105° C., powdering the dried product, and finally reducing the mixture in a current of hydrogen at 400° C. for about two hours. The nickel content of the product should be about 9 to 15%, e. g. 14%. Other catalysts such as Raney nickel, platinum, palladium and mixtures thereof may be used but the noble metals alone are generally expensive for large scale production, are less selective, and are usually more readily poisoned. With other hydrogenation catalysts the process may be similarly operated but other temperature conditions may be necessary.

The process is usually operated as indicated above by heating the tall oil or its compound in contact with hydrogen and the catalyst until substantial absorption of hydrogen begins to take place but substantially below the temperature at which rosin absorbs hydrogen. The temperature is then held constant until no further drop in pressure is observed. The autoclave is cooled, the pressure released, and the partially hydrogenated product removed. It will be found to have a pleasanter odor, lighter color and substantially higher melting point. The quantity of hydrogen consumed is relatively low because only the fatty acids, and not the rosin, have absorbed hydrogen. By operation of the process at temperatures below that at which oleic acid or its isomers absorb hydrogen, it is possible to obtain a product containing a maximum mono-olefinic acid content by hydrogenation of the polyolefinic acids to mono-olefinic fatty acids.

The process is particularly adapted to continuous countercurrent hydrogenation. The preheated tall oil is passed into the top of a jacketed corrosion-resistant chamber or tower packed with granular catalyst and/or catalyst screens. Hydrogen gas, preferably warmed to the desired reaction temperature, is introduced into the bottom of the tower and flows upwardly countercurrent to the downwardly flowing tall oil material. The gas is removed at the top and may be purified and recycled for further use. This treatment not only hydrogenates the polyolefinic acids (and mono-olefinic if so desired) but sweeps out undesirable volatile materials which in part cause the bad odor and darkening of the tall oil. Other methods of continuous hydrogenation may be employed.

Although it is possible to selectively hydrogenate the desired constituents in the tall oil in admixture, it is also possible to separate the tall oil into fractions, either pure or predominating in the desired constituents, and to hydrogenate these fractions. Alternatively the tall oil may be selectively hydrogenated and then be separated into its constituents.

The following examples are for the purpose of illustrating the present invention but are not intended to be limiting on the scope thereof.

*Example I*

1,000 parts by weight of distilled highly unsaturated tall oil acids and 35 parts by weight of 14% nickel-kieselguhr catalyst are placed in the glass lined pressure hydrogenation bomb. The bomb is then assembled and evacuated to remove as much air as possible. Hydrogen gas is flowed into the bomb until a pressure of about 50 pounds per square inch gage is built up. The pressure is released and the bomb evacuated in order to sweep out residual oxygen from the system. The bomb is then filled again with hydrogen to a pressure of about 600 pounds per square inch gage at room temperature. The bomb is then rocked mechanically to thoroughly agitate the contents while the temperature is raised at a constant rate of about three degrees per five minutes. At this time it is advantageous to plot a curve of the temperature against the pressure. At first the pressure increases directly proportional to the increase in temperature. When at a temperature of about 65° C., the pressure will not increase at as high a rate, indicating absorption of hydrogen by the polyolefinic acids to form oleic acid or its isomers. The temperature can be held at the breaking point in the curve or at about 5° to 10° C. higher, e. g. at about 73° C. When substantially no more hydrogen gas is absorbed, the product will have a maximum content of mono-olefinic acids. The product has a sharp increase in titer from about 3° C. to about 18° C., with a slight decrease in iodine value from 138 to 132, a very desirable result. To obtain a higher melting product the temperature is raised to about 80° to 100° C., at which point a second and very material absorption of hydrogen takes place by saturation of the fatty acids without substantial alteration of the rosin or unsaponifiable material contained therein. The tall oil obtained is much lighter in color and improved in odor. It makes a hard soap of desirable color, odor and physical properties.

*Example II*

The process of Example I is repeated but employing a tall oil which in the soap state had been extracted with a hot aqueous concentrated caustic alkaline sodium chloride brine, freed of unsaponifiable constituents, and in the acid state fractionated to obtain a predominately fatty acid fraction. The process produces an exceptionally light colored, stable product. The titer of the acids is raised from about 6° C. to about 55° C.

*Example III*

About 100 parts by volume of crude tall oil and about 1.0% by weight of nickel as a 14% nickel-kieselguhr catalyst are treated as described in Example I, but in this case at a temperature of about 90° C., that is, about five degrees above the point at which hydrogen absorption first takes place.

It should be noted that contrary to the prior art statements, tall oil may be hydrogenated by the applicants' process without previous purification steps or removal of anti-catalysts. It is, however, desirable in certain instances when highly refined products or individual constituents are sought, to treat the tall oil either before or after hydrogenation to purify and/or fractionate it.

For example, before the hydrogenation, it is highly advantageous to treat the tall oil soaps freshly obtained in paper-making processes, preferably under non-oxidizing conditions, with a substantially immiscible, hot, aqueous caustic alkaline salt solution so as to separate the phenolic, mercaptan, and lignin-like substances from the soaps thus obtained. It is also desirable to blow the hot soap mixture with air or steam, flue gases, and/or other non-reactive gases to volatilize the unsaponifiable, lower boiling, odoriferous materials, before, during or after the alkaline brine extraction. The blowing advantageously may accompany the brine treatment in order to obtain thorough agitation and washing of the tall oil soap with the caustic brine solution. Steam agitation likewise heats the soap, reduces its viscosity and increases the solubility of the impurities in the extracting solution. The presence of the inorganic salts and/or base during the blowing operation also serves to open the soap. Without these inorganic materials being present in proper proportion the soap is tough and plastic, thus preventing substantial removal of the volatile impurities. After settling, the soaps of the carboxylic acid may then be separated from the brine by drawing off the brine, by decanting, or by centrifuging, thinned with water again, and washed with a fresh caustic alkaline brine of sodium sulphate, sodium chloride and/or the like. The treatment is preferably before the hydrogenation of the tall oil but may be conducted on the soap of the tall oil after hydrogenation. When acidified the organic acid product is clear, lighter in color, and substantially free from precipitated lignin materials. Many of the colored and potentially colored materials are removed, thus effecting an economy of hydrogen and catalyst in the subsequent hydrogenation treatment.

Furthermore, the tall oil in the form of its soap, before or after the hydrogenation, may be subjected to a properly regulated heat treatment, at relatively high temperatures, while passing a strong current of steam or inert gas through it, advantageously under reduced pressure, in the substantial absence of air and liquid water. This high temperature steam treatment of the anhydrous soaps removes the unsaponifiable material from the saponified mass, and apparently radically changes and materially improves the characteristics of the saponified material. The treatment may be carried out at various temperatures, preferably ranging from about 250° to about 350° C.

Various alkaline materials may be used for the saponification, including caustic alkalies (caustic soda or potash), lime, carbonated alkalies (soda ash or potassium carbonate), limestone, marble dust, magnesium carbonate, dolomite, etc., or mixtures thereof. Soda ash is preferred because it is cheap, effective, and produces a directly usable sodium soap. The previous removal of complex phenols and lignin material from the tall oil soaps prevents the finished soap from being discolored by the high temperature decomposition products of these materials. The hot anhydrous soap may be cooled on rolls to form a flake or be sprayed with or without water in a suitable tower in the substantial absence of free oxygen to yield a grain or bead. The hot anhydrous soap may be added to water or soap solution in order to obtain a neat soap.

It is also possible to dissolve the tall oil in gasoline and to treat this solution with furfural, clay, silica gel, amphoteric metal halides such as stannic chloride, or with similar materials to remove additional viscous, resinous and/or color bodies. The tall oil may be lightened in color by distillation at any point during the treatment of the tall oil in order to improve the final products.

It has, therefore, been made possible to separate the tall oil into valuable constituents, thus recovering the hydrogenated fatty acids, the resin acids, lignin, phenolic bodies, and the sterol-like bodies in individual fractions since these materials, so separated, are far more valuable and have greater utility than promiscuous mixtures, thereof. The separated hydrogenated fatty acids can be used for preparing high grade soap or even edible products. The rosin acids can be used in resin, adhesive and coating compositions, as well as for laundry soaps. The hydrogenated unsaponifiable and sterol-like bodies can be used in preparing various synthetic chemical compositions such as perfumes, plasticizers, and sulphonated wetting agents and detergents. The phenolic bodies can be used for chemical preparation such as perfumes, flavors, medicines and synthetic resins.

The separation of the acid ingredients is best effected by fractional distillation by any standard procedure of the hydrogenated acids from the tall oil soaps which have been brine washed and treated in the anhydrous state at an elevated temperature in the presence of steam in order to first remove the non-saponifiable materials substantially consisting of sterol-like bodies, the phenols having previously been removed by the novel alkaline brine wash previously described. The absence of the phenols and the non-saponifiables which have a very broad boiling range renders the separation of the fatty acids by distillation more efficient. The raw material, however, may be fractionally distilled in order to separate the acidic constituents into fatty acids and resin acids and then the anhydrous soaps thereof may be treated to separate the non-saponifiables, or the process may include fractional distillation of the acids and their fractions at any suitable point in the process. The material may likewise be fractionated by fractional crystallization from acetone or similar solvents, preferably after the removal of non-saponifiables.

It is also possible in order to effect separation of the resin acids from the fatty acids by distillation or the like to esterify the fatty acids in the presence of inorganic acids such as sulphuric acid or hydrochloric acid with one or more alcohols such as methyl alcohol, ethyl alcohol, isopropyl alcohol and butyl alcohols. The esters of the fatty acids differ appreciably in chemical and physical properties from the rosin acids and hence may be more readily separated therefrom than the original fatty acids by fractional distillation.

It is possible to treat the tall oil alone or in admixture with other fatty acids, fatty oils, fats, waxes, naphthenic acids or the like, according to the principles of the present invention.

As many widely different embodiments of the present invention may be made without departing from the spirit and scope thereof, it is to be understood that the application is not limited to the specific proportions or embodiments thereof except as defined in the following claims.

We claim:
1. The process of saturating olefinic bonds of unsaturated fatty acids in tall oil which comprises treating tall oil with hydrogen at a pressure of at least 50 pounds per square inch in the presence of a nickel catalyst and at a temperature above 50° C. but below 135° C.

2. The process of saturating olefinic bonds of unsaturated fatty acids in tall oil which comprises treating tall oil with hydrogen at a pressure of at least 600 pounds per square inch in the presence of a nickel catalyst and at a temperature above 50° C. but below 135° C.

3. The continuous process of saturating olefinic bonds of unsaturated fatty acids in tall oil which comprises continuously contacting a stream of tall oil with a stream of hydrogen under pressure of at least 50 pounds per square inch in the presence of a nickel hydrogenation catalyst and at a temperature above 50° C. at which hydrogen is absorbed by the oil but below 135° C.

4. The continuous process of saturating olefinic bonds of unsaturated fatty acids in tall oil which comprises continuously contacting a falling stream of tall oil with a rising, counter-current stream of hydrogen under pressure of at least 50 pounds per square inch in the presence of a nickel hydrogenation catalyst and at a temperature above 50° C. at which hydrogen is absorbed by the oil but below 135° C.

5. The product of the process of claim 1.

6. The process of saturating olefinic bonds of polyolefinic fatty acids in tall oil which comprises treating tall oil with hydrogen at a pressure of at least 50 pounds per square inch in the presence of a nickel hydrogenation catalyst and at a temperature above 50° C. but below about 73° C.

7. The process of saturating olefinic bonds of polyolefinic fatty acids in tall oil which comprises treating tall oil with hydrogen at a pressure of at least 600 pounds per square inch in the presence of a nickel catalyst and at a temperature of about 65° C. to about 73° C.

8. In the hydrogenation of tall oil, said tall oil having the property, when slowly heated with hydrogen under pressure in the presence of a hydrogenation catalyst, of absorbing hydrogen to produce the maximum content of mono-olefinic acids within a first temperature range at and slightly above the point where a decrease in the rate of pressure increase relative to the rate of temperature increase first occurs, and of thereafter absorbing hydrogen to saturate the fatty acids within a second and higher temperature range at and above the point where a decrease in the rate of pressure increase relative to the rate of temperature increase next occurs; the method which comprises treating tall oil with hydrogen at a pressure of at least about 50 pounds per square inch in the presence of a hydrogenation catalyst and at a temperature within said first temperature range.

9. In the hydrogenation of tall oil, said tall oil having the property, when slowly heated with hydrogen under pressure in the presence of a hydrogenation catalyst, of absorbing hydrogen to produce the maximum content of mono-olefinic acids within a first temperature range at and slightly above the point where a decrease in the rate of pressure increase relative to the rate of temperature increase first occurs, of thereafter absorbing hydrogen to saturate the fatty acids within a second and higher temperature range at and above the point where a decrease in the rate of pressure increase relative to the rate of temperature increase next occurs, and of thereafter absorbing hydrogen to hydrogenate the rosin acids within a third and still higher temperature range at and above the point where a decrease in the rate of pressure increase relative to the rate of temperature increase next occurs; the method which comprises treating tall oil with hydrogen at a pressure of at least about 50 pounds per square inch in the presence of a hydrogenation catalyst and at a temperature within said first and second temperature ranges.

10. In the hydrogenation of tall oil, said tall oil having the property, when slowly heated with hydrogen under pressure in the presence of a hydrogenation catalyst, of absorbing hydrogen to produce the maximum content of mono-olefinic acids within a first temperature range at and slightly above the point where a decrease in the rate of pressure increase relative to the rate of temperature increase first occurs, of thereafter absorbing hydrogen to saturate the fatty acids within a second and higher temperature range at and above the point where a decrease in the rate of pressure increase relative to the rate of temperature increase next occurs, and of thereafter absorbing hydrogen to hydrogenate the rosin acids within a third and still higher temperature range at and above the point where a decrease in the rate of pressure increase relative to the rate of temperature increase next occurs; the method which comprises continuously contacting a stream of tall oil with hydrogen under pressure of at least about 50 pounds per square inch in the presence of a hydrogenation catalyst and at a temperature within said first and second temperature ranges.

11. The process of selective partial hydrogenation of unsaturated constituents of tall oil which comprises treating tall oil with hydrogen at a pressure of at least 50 pounds per square inch in the presence of a hydrogenation catalyst and at a temperature above 50° C. but below the temperature at which the rosin acids substantially absorb hydrogen.

JOSEPH ABRAHM VALENTINE TURCK, Jr.
JOHN ROSS.